Patented Sept. 2, 1952

2,609,390

UNITED STATES PATENT OFFICE 2,609,390

PHOSPHONIC ALKYLENE POLYAMINO ACIDS AND METHOD OF PRODUCING SAME

Frederick C. Bersworth, Verona, N. J.

No Drawing. Application June 1, 1950,
Serial No. 165,598

3 Claims. (Cl. 260—500)

This invention has for its object the provision of alkylene diamine N, N' di(methylene phosphonic) -N, N' diacetic acids for use as metal ion sequestering agents.

Another object is to provide methylene phosphonic acid ethylene diamine acetic acid compounds.

Still another object is to provide a chelating and complexing agent for metal ions in aqueous solutions which is capable of chelating and complexing mono- and poly-valent metal ions to form non-ionic compounds therewith.

Other objects will be apparent as the invention is more fully disclosed.

In accordance with these objects I have discovered that when the amino hydrogens of an alkylene diamine are displaced in part by alkyl phosphonic acid groups and in part by acetic acid groups or its homologue acid groups, the resultant phosphonic diamino acetic acid is a strong chelating agent towards metal ions in aqueous solution and mono- and poly-valent metals forming chelate compounds therewith which are soluble in water and are stable over a wide range of pH.

As one specific embodiment of the present invention but not as a limitation thereof, I will describe the same as it has been adapted in the forming of the phosphonic acid alkylene diamino acetic acids derived from ethylene diamine, these compounds being the most economically practical ones to produce at the present time.

In forming the phosphonic alkylene diamino acids of the present invention from ethylene diamine, I prefer to produce the symmetric compounds wherein the methylene phosphonic and acetic acid groups are substituted in N, N' positions respectively giving compounds of the following general formula:

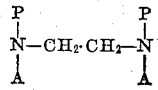

wherein P represents a methylene phosphonic acid group and A represents an acetic acid group.

In producing such a symmetrically substituted diamino acid several methods are available but the simplest and most economically practical method appears to be to react a chloromethylene phosphonic acid with ethylene diamine diacetic acid in alkaline pH aqueous solution, preferably at a pH of 10 to 11. In the performance of this reaction I have discovered that when the acetic acid groups of the amino acid are immobilized by chelating the same with a di-valent heavy metal such as copper which subsequently may be removed by precipitation with H₂S, the substitution reaction with the alkyl phosphonic acid chloride is facilitated and markedly accelerated.

As an example of this reaction, I dissolve one molar weight of ethylene diamine diacetic acid and one molar weight of freshly precipitated copper hydroxide in water sufficient to provide a solution having a concentration of from 40% to 50% of the resulting copper complex of the amino acid.

This solution is heated to a temperature within the range 60° C. to refluxing temperature and sufficient NaOH is added thereto to provide a pH of 10–11 to the solution, and then two (2) molar weights of the chloromethylene phosphonic acid, $Cl \cdot CH_2 \cdot PO \cdot (OH)_2$, is added to the solution relatively slowly with constant vigorous stirring of the solution and the heating is continued for an extended time approximating 10 to 18 hours until the substitution reaction is completed. A strong base such as NaOH or Na₂CO₃ is added simultaneously with the chloromethylene phosphonic acid to maintain alkaline conditions in the reaction solution as the reaction proceeds. Alternatively the additional base may be added before the introduction of the chloromethylene phosphonic acid, if desired.

The reaction solution is then diluted to about three (3) times its volume, cooled to room temperature, neutralized with hydrochloric acid to a pH of 6.5–7, and H₂S is passed through the solution to precipitate the copper ions present therein as insoluble copper sulfide.

The resulting copper-free solution after boiling to expel the H₂S may be treated in a number of different ways for the recovery of the methylene phosphonic alkylene diamino acetic acid compound present therein. One way is to acidify the solution with hydrochloric acid to a pH of about 2 at which the phosphonic alkylene diamino acid precipitates, filtering and washing with HCl acidulated water. Another way is to add free caustic alkali to the solution to a pH of 10 to 11 and evaporating the solution to a concentration at which the sodium salt of the phosphonic alkylene diamino acid crystallizes out of solution. The first method is preferred as the acid precipitate obtained is substantially free of associated impurities.

The structural formula of the acid precipitate appears to conform to the following:

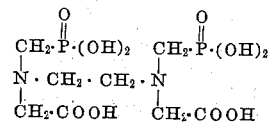

An alternative procedure, which is practical but less convenient than that described above involves the use of ethylene diamine dimethylene phosphonic acid disclosed in my copending application Serial No. 165,597, filed June 1, 1950. This substance is treated with sodium cyanide and formaldehyde by the process described in my Patents No. 2,387,735 and No. 2,387,976. The product is obtained as the solid hexasodium salt (of the acid shown above) by addition of a large volume of ethanol to the reaction solution.

The diphosphonic-diacetic diamino acid having the formula given above is soluble in $H_2O$, and in acid and alkaline pH solutions.

This polyfunctional diamino acid apparently has six active centers for chelate formation with metal ions. It is believed that the two carboxylic anions, the two phosphonate anions and the two tertiary nitrogen atoms are capable of combining with metal ions to form very stable complexes with multiple chelate rings. These groups react strongly with metal ions having a valence of two or more in alkaline and neutral solutions. In weakly alkaline solutions the chelation is somewhat weaker while strong acids result in the complete displacement of the metals from the complex. Chelation with monovalent ions is considerably weaker than that with the divalent metals. It is not known whether all six chelating groups are simultaneously bonded to a given metal ion, but it has been established that the molar ratio of chelating agent to metal ion is 1:1. Therefore it is possible to give as a tentative formula for a metal chelate formed by ethylene diamine di(methylene phosphonic) diacetic acid the following structure:

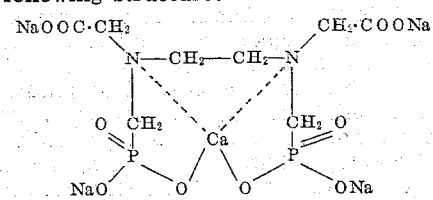

it being understood that the acetic acid group may also be involved in complex formation.

This chelate may be formed in aqueous solution from insoluble calcium compounds, such as the oxalate, carbonate, and phosphate.

Some of the heavy metal ions, particularly those which tend to hydrolyze in aqueous solution are believed to be rendered soluble by some such reaction as the following:

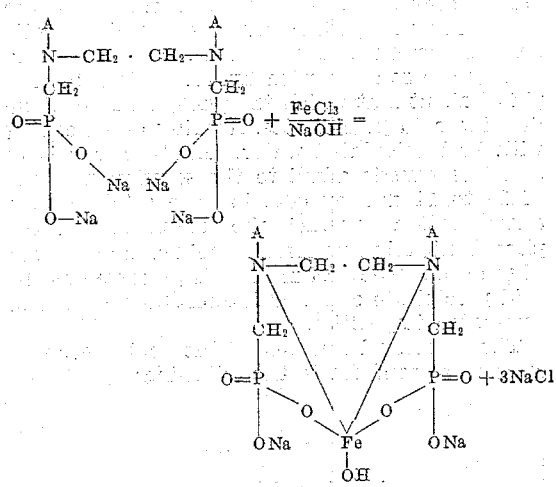

wherein A represents the sodium acetate groups indicated previously.

In the presence of a large excess of NaOH in the solution this complex compound is unstable and the iron hydroxide tends to precipitate.

When the ratio of metal to chelating agent is greater than 1:1, it was found that the metal may be completely complexed, although the strength or stability of the complex is always somewhat lower. This shows a remarkable and specific property of the alkylene diamine di(methylene phosphonic) diacetic acid type of chelating agent: i. e., whereas a very strong 1:1 chelate is formed, the action is not restricted to this and the reagent may complex an additional amount of metal ion. Thus two moles of the calcium chelate having the probable formula shown above was found to chelate one mole of $Fe^{III}$ ion. It is believed the combination involves two moles of chelating agent and three metal ions forming a complex such as is indicated in the following formula:

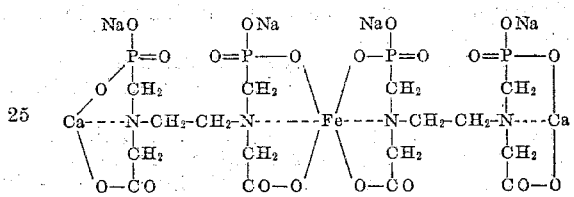

In the presence of excess calcium chelate the stability of the iron complex increases even in the presence of excess NaOH and a minimum ratio of two molar weights of the Ca chelate to one molar weight of $Fe^{III}$ ion appears to be the minimum ratio for solubility.

Other complex chelate structures are possible than the one given above, but this structure appears to conform to the known facts more closely than others and is preferred.

Substantially the same reaction occurs with other polyvalent metal ions in alkaline pH solution which tend to hydrate and precipitate out of solution in the presence of a strong base such as a caustic alkali.

Whereas, in the above disclosure I have described the calcium chelate compound of the phosphonic diamino acid, substantially the same type chelate compound is formed with any other mono- or di-valent metal ion.

One of the characteristics of this type of alkylene diamine di(methylene phosphonic) diacetic acid is that as the number of carbon atoms in the alkylene group between the two nitrogens is increased beyond 6, the affinity of the chelating agent for metal ions is greatly impaired. The most effective is the ethylene derivative, while the propylene and trimethylene compounds are only slightly less so. It has been found impractical, for the reason just noted, to increase the total number of carbon atoms beyond 6.

On the other hand, as the higher homologues of acetic acid are substituted for acetic acid, with increase in the number of carbon atoms interposed between the nitrogen atom and the carboxylic group the chelating properties of the compound decreases and the carboxylic acid group reacts as a mono-valent acid in salt formation with mono-valent basic metal compounds and the chelating of bi-valent metal ions is suppressed.

Accordingly, I prefer to restrict the carboxylic substituent group to acetic acid thereby to maintain the chelating properties of the compounds towards poly-valent metals particularly high.

While I have disclosed the compounds of the present invention as those derived from the alkylene diamine, ethylene diamine, it is believed apparent that any other alkylene diamine may be substituted for ethylene diamine without departure from the invention, and in particular those alkylene diamines which heretofore in the art have been recognized as being chelating compounds when at least two of the amino hydrogens of the polyamine have been displaced by carboxylic groups such as acetic acid such as, for example, those alkylene diamino acids described in my above identified prior patents, or in Munz Patent No. 2,240,957, and many other prior patents. Of these plurality of alkylene diamino acids those derived from ethylene diamine are most economically practical and have shown the greatest stability as well as commercial utility but the term ethylene diamine as it hereinafter appears in the claims is to be construed as including these other alkylene polyamine and polyamino acids.

Having hereinabove disclosed the present invention generically and specifically and given several specific examples of the same, it is believed apparent that the same may be widely varied without departure from the invention and all such departures and modifications thereof are contemplated as may fall within the scope of the following claims.

What I claim is:

1. Compounds selected from the group consisting of acids having the structure:

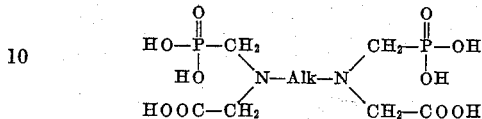

wherein Alk represents an alkylene radical ($C_nH_{2n}$) containing from 2 to 6 carbon atoms and alkali metal salts thereof.

2. The alkali metal salts of the compounds of claim 1.

3. The compound of claim 1 wherein Alk represents the ethylene group, $CH_2 \cdot CH_2$.

FREDERICK C. BERSWORTH.

No references cited.